United States Patent Office 2,724,706
Patented Nov. 22, 1955

2,724,706

HEAT AND LIGHT STABLE VINYL RESIN

Frederick C. Bersworth, Framingham Center, Mass., assignor to The Dow Chemical Company, Midland, Mich., a corporation of Delaware No Drawing. Application May 16, 1952,
Serial No. 288,335

7 Claims. (Cl. 260—45.75)

This invention relates to heat and light stable vinyl resins and more particularly to such resins, wherein the stabilizing agent employed therein is non-toxic.

The object of the invention is to provide a non-toxic heat and light stabilized vinyl resin.

Another object is to provide a non-toxic compound of one of the metals lead, cadmium, tin and zinc for use as a heat and light stabilizing agent in vinyl resins.

Still another object is to provide a non-ionic and non-toxic chelate compound of one of the metals of the group consisting of lead, cadmium, tin and zinc, which is miscible with vinyl resins and which is capable of stabilizing the said resin from deterioration under the influence of heat and light radiation.

Other objects and advantages will be apparent as the invention is more fully hereinafter disclosed.

In accordance with these objects I have discovered that chelate compounds of the metals of the group consisting of lead, cadmium, tin and zinc and the alkylene polyamine polyacetic acids are non-toxic compounds; that these said chelate compounds are miscible with the vinyl resins; and that when they are incorporated in the said vinyl resins they unexpectedly stabilize the resin against deterioration under the influence of heat and light radiation. By the term light radiation I mean to identify radiation having wavelengths within the range 2,000 to 17,000 Angstrom.

The chelate compounds of the present invention fall within the scope of the following generic formula:

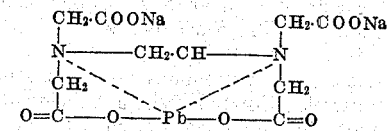

wherein alkylene is one of the group consisting of $CH_2 \cdot CH_2$; $CH_2 \cdot CH_2 \cdot CH_2$ and $CH(CH_3)CH_2$; A is a metal of the alkali and alkaline earth metal groups and M is one of the metals of the group consisting of Pb, Cd, Sn and Zn.

These chelate compounds may be formed in a plurality of different ways, the most effective way, however, being to dissolve one molar weight of the alkylene diamine tetraacetic acid in water containing two (2) molar weights of an alkali or alkaline earth metal hydroxide and adding thereto an excess amount of two (2) molar weights of lead, cadmium, tin or zinc oxide and heating and stirring the solution for an extended time interval to obtain complete neutralization of the amino acid with formation of the lead, tin or zinc chelate. The excess metal oxide is removed by filtration and the resultant clear solution of the chelate compound is evaporated to dryness, preferably under vacuum, to recover the chelate compound as a white amorphous solid.

As a specific example of the present invention the disodium lead chelate compound of ethylene diamine tetraacetic acid will first be described. This compound prepared as above described using sodium hydroxide and lead oxide has the formula:

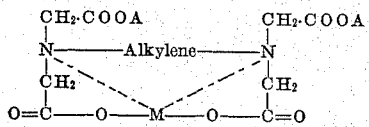

This compound when incorporated in a co-polymer of vinyl acetate vinyl chloride resin (known also as polyvinyl chloride acetate resin) in an amount ranging from 2% to 5% by weight is completely miscible with the resin to give on curing the mixture a substantially clear final resin product, which is effectively stabilized against deterioration under heat and light radiation. As an example; several samples of this resin containing 3.0% of the Pb chelate compound were molded into articles of about .02" thickness and some of the articles were heated to a temperature of 150° C. along with samples of the same resin containing lead stearate and lead silicate total 3% as stabilizers. The samples without the lead chelate compound commenced to darken at about 3 hours of heating while the samples containing the lead chelate did not show any indication of darkening for 26 hours.

Other molded articles of this resin mixture were subjected to the action of ultraviolet radiation emanating from a type of bactericidal lamp sold under the code No. G30T8 operating at 30 watts. As in the first test the articles comprised of the resin mixture of the instant invention withstood deterioration for a time interval of 6 days whereas articles comprised of the resin without the chelate compound present therein started to darken at 3 days.

Other samples subjected to test using incandescent filament lamps as a source of light and heat radiation, of various wattages withstood deterioration for a length of time varying with variation in the wattage and with the extent the outside radiation was excluded which on the average was from two to ten times that of the resin without the chelate compound.

Similar tests with the tin and zinc chelate compounds substituted for the lead chelate compound of the above example, produced substantially equivalent results, but my tests have indicated that while 2% of these chelate compounds usually is sufficient to increase the resistance of the resin to deterioration for a time interval four times that of the resin without the chelate compound the extent of the resistance to deterioration increases to a maximum value at about 5% of these chelates and that amounts of the chelate over 5% do not substantially provide a further increase in the resistance of the resin to deterioration, and hence for the purposes of the present invention are not essential.

The chelate compounds of the present invention have been demonstrated to be non-toxic, per se. For example, lead acetate is known to be highly poisonous. The lead chelate of the instant invention has a stability constant $10^{-18}$. This means that the chelate has an ionization in water which is $10^{-18}$ less than that of the lead acetate. The poisoning effect of this lead chelate therefore is substantially zero and tests have shown that it may be safely injected into the animal system for purposes of opacifying the system to x-radiation. This non-toxicity of the chelate compound common to all lead chelates of the alkylene polyamine polycarboxylic acids above identified and is believed due to the fact that the chelate compound is highly soluble in water and in the body fluids and is rapidly excreted from the system, and that the lead, cadmium, tin and zinc ions present in the chelate compound are held so strongly in chelate combination that they are not readily displaced therefrom by base exchange reaction with other metal ions present in the system, or by the usual precipitating reagents therefor.

The use of these heat and light stabilizing agents in the resin, accordingly, overcomes the present prejudice and prohibition against the use of lead, cadmium, tin and zinc salts and compounds in these resins where the resin is to be employed in articles of manufacture that come into contact with foodstuffs or be handled by humans.

Further, the chelate compounds of the present invention being miscible with the resin and being dispersed therein without substantial segregation with the metallic ion held in non-ionic combination is not subject to extraction therefrom when the resin is in contact with moist articles or with liquid mediums.

It is believed apparent that the chelate compounds wherein alkylene is one of the group consisting of $CH_2 \cdot CH_2$; $CH_2 \cdot CH_2 \cdot CH_2$ and $CH(CH_3)CH_2$ are full equivalents to the ethylene diamine chelate of the above specific embodiment and can be expected to react substantially the same as the ethylene diamine chelate of the specific embodiment and my tests have confirmed this fact.

It is believed apparent that various known plasticizer agents may be added to the vinyl resin containing the heat and light stabilizing chelate compound of the present invention without departure from the present invention. In fact, it is apparent that by the use of the chelate compounds of the present invention in the resin the type and kind of plasticizer agent that may be employed is greatly enlarged for the essential reasons that the metal ion constituent in the said chelate is non-ionic and non-reactive with the said plasticizer agent.

Having hereinabove described the present invention generically and specifically and having given several specific embodiments thereof, it is believed apparent that the same may be widely varied without essential departure therefrom and all such are contemplated as may fall within the scope of the following claims.

What I claim is:

1. A composition comprising a vinyl chloride-containing resin blended with a chelate compound of metal from the group consisting of lead, cadmium, tin and zinc and an alkylene polyamine polyacetic acid, said chelate compound conforming to the composition

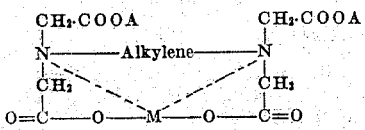

wherein M is one of the said metals, alkylene is a low molecular weight alkylene group and A is one of the group consisting of alkali metals and alkaline earth metals.

2. A composition in accordance with claim 1 in which the resin is a vinyl chloride vinyl acetate copolymer.

3. A composition in accordance with claim 1 in which the resin contains from about 2 to about 5 per cent by weight of the said chelate compound.

4. A composition in accordance with claim 3 in which the chelate is a lead chelate.

5. A composition in accordance with claim 3 in which the chelate is a cadmium chelate.

6. A composition in accordance with claim 3 in which the chelate is a tin chelate.

7. A composition in accordance with claim 3 in which the chelate is a zinc chelate.

References Cited in the file of this patent

UNITED STATES PATENTS 2,558,728   Britton et al. _____ July 3, 1951

OTHER REFERENCES

Brintzinger et al.: Zeitschrift für Anorganische und Allgemeine Chemie (1943), vol. 251, pages 285–286.